United States Patent

[11] 3,613,846

| [72] | Inventor | Thaddeus F. Zlotek<br>Center Line, Mich. |
|---|---|---|
| [21] | Appl. No. | 2,078 |
| [22] | Filed | Jan. 12, 1970 |
| [45] | Patented | Oct. 19, 1971 |
| [73] | Assignee | Formsprag Company<br>Warren, Mich. |

[54] HOLLOW SPRAG
5 Claims, 6 Drawing Figs.

[52] U.S. Cl. ...................................... 192/41 A,
192/45.1
[51] Int. Cl. ...................................... F16d 41/07
[50] Field of Search ............................ 192/41 A,
45.1

[56]            References Cited
          UNITED STATES PATENTS
2,711,238   6/1955   Szady .......................... 192/45.1

| 2,930,461 | 3/1960 | Dodge | 192/45.1 |
| 3,302,761 | 1/1967 | Zlotek | 192/45.1 |

FOREIGN PATENTS

| 875,357 | 8/1961 | Great Britain | 192/45.1 |
| 1,254,264 | 1/1961 | France | 192/45.1 |

Primary Examiner—Allan D. Herrmann
Attorney—Whittemore, Hulbert & Belknap

ABSTRACT: A torque-transmitting sprag, otherwise solid in cross section, has one or more openings extending substantially throughout the axial length thereof between shaped working surfaces at which it engages coaxial clutch races, and front and rear surfaces of the sprag. The opening reduces the sprag weight, governs the location of its center of gravity and, more importantly, enables the sprag to flatten slightly at the race surfaces, under radial load, thereby reducing unit internal stress and, in reducing mass, permitting higher efficient operating speeds. The opening may be variously located in regard to sprag trunnion means, if present, or to the sprag's working and other surfaces.

PATENTED OCT 19 1971 3,613,846
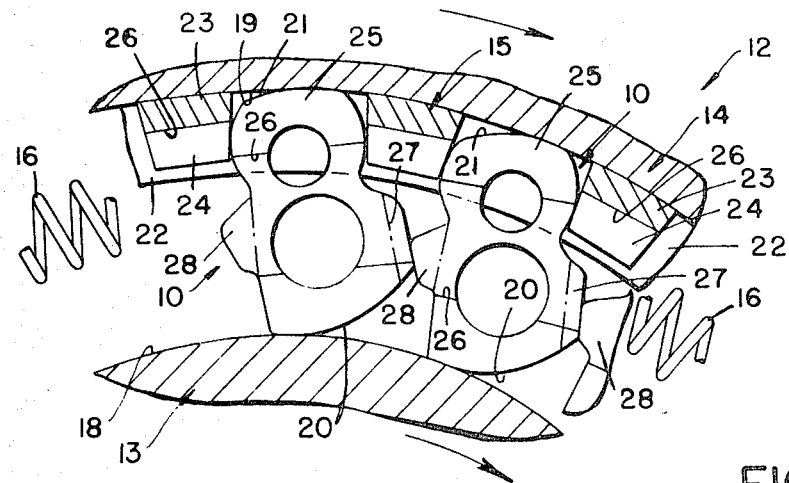
INVENTOR.
THADDEUS F. ZLOTEK
BY
ATTORNEYS

United States Patent

[11] 3,613,847

| [72] | Inventor | Hiroto Masai<br>Toyota, Japan |
|---|---|---|
| [21] | Appl. No. | 884,604 |
| [22] | Filed | Dec. 12, 1969 |
| [45] | Patented | Oct. 19, 1971 |
| [73] | Assignee | Aisin Seiki Kabushiki Kaisha<br>Kariya, Japan |
| [32] | Priority | Dec. 21, 1968 |
| [33] | | Japan |
| [31] | | 43/93885 |

[54] FLUID DRIVE COUPLING
5 Claims, 6 Drawing Figs.

[52] U.S. Cl. .................................................. 192/58 B,
192/82 T
[51] Int. Cl. .............................................. F16d 31/08,
F16d 35/00
[50] Field of Search ............................................ 192/58 A,
58 B, 58 C, 82 T

[56] References Cited
UNITED STATES PATENTS

| 3,174,600 | 3/1965 | Oldberg | 192/82 T |
| 3,339,689 | 9/1967 | Sutaruk | 192/58 B |
| 3,490,686 | 1/1970 | Weir | 192/58 B X |

*Primary Examiner*—Allan D. Herrmann
*Attorney*—Pierce, Scheffler & Parker

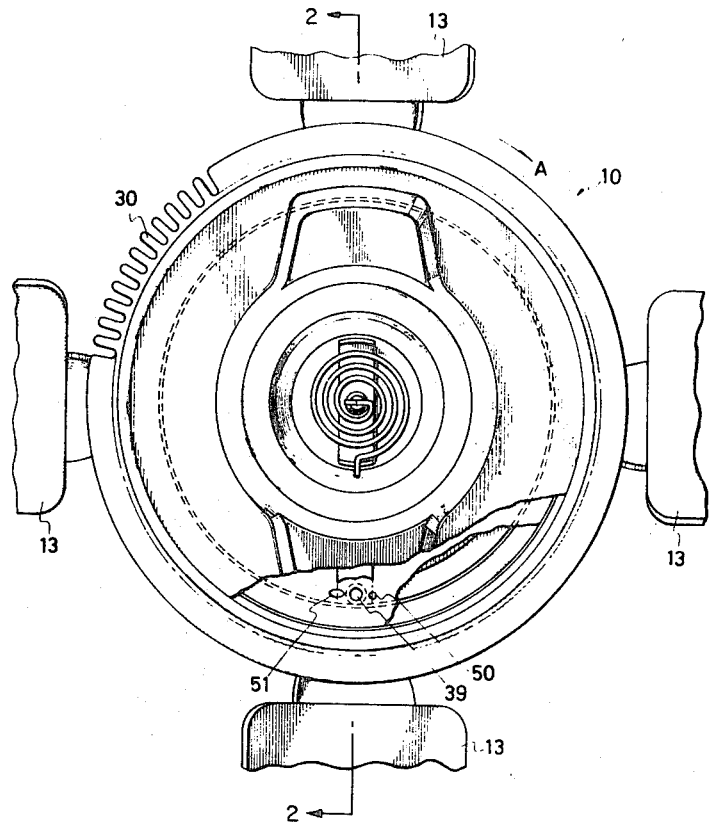

ABSTRACT: A fluid-coupling device of temperature responsive type for automotive use, wherein fluid chamber means constituted by an output member is divided by a partition plate supported by the output member into a fluid-working chamber carrying an input member therein and a fluid reservoir or storage chamber, the partition plate radially outward comprising an impact portion, a discharge hole in front thereof and an inlet opening in back thereof relative to the direction of the inlet hole or discharge opening and being covered by a valve arm disposed axially and operated thermostatically so as to control the volume of viscous fluid supplied to the driving rotor.